(No Model.) 2 Sheets—Sheet 1.
H. HOLLERITH & S. G. METCALF.
APPARATUS FOR CORRUGATING METAL TUBING.
No. 349,718. Patented Sept. 28, 1886.
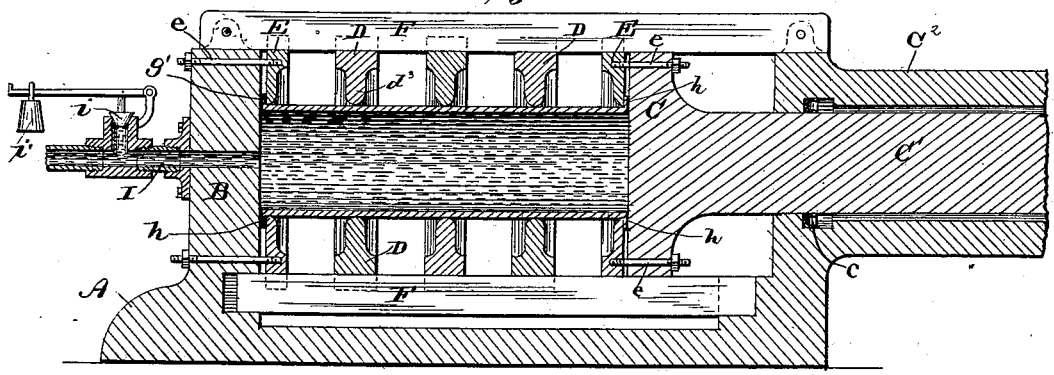
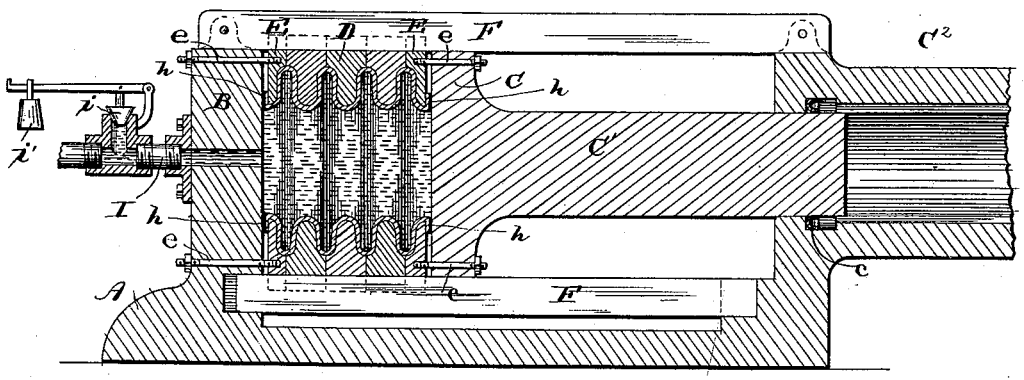
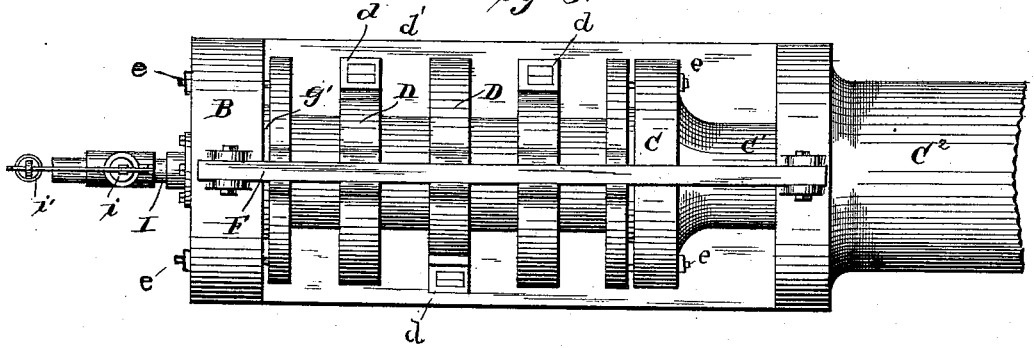

(Model.)
2 Sheets—Sheet 2.
H. HOLLERITH & S. G. METCALF.
APPARATUS FOR CORRUGATING METAL TUBING.
No. 349,718. Patented Sept. 28, 1886.
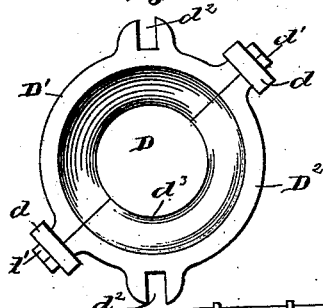
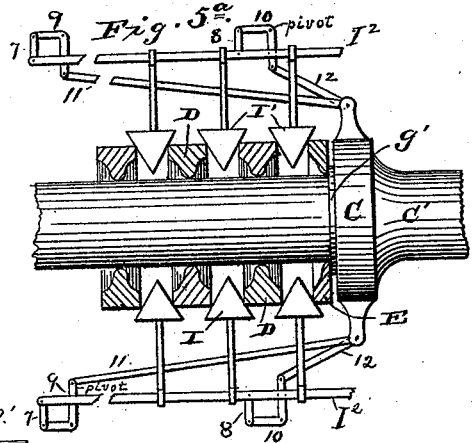
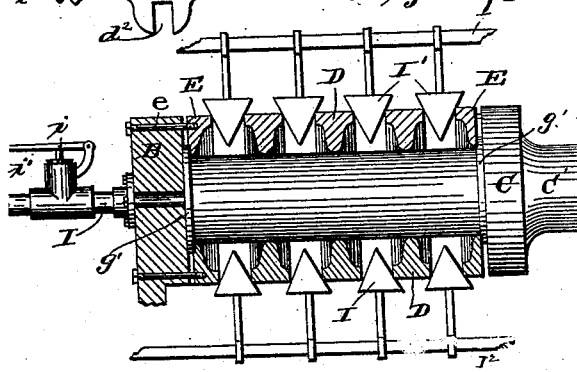
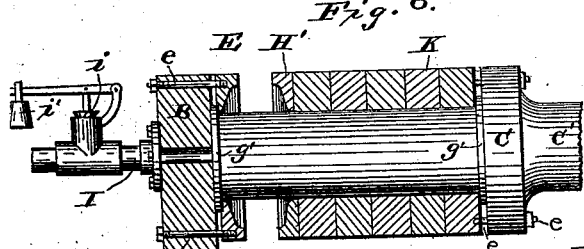
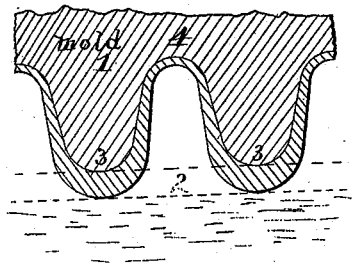
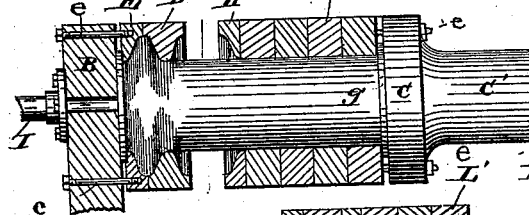
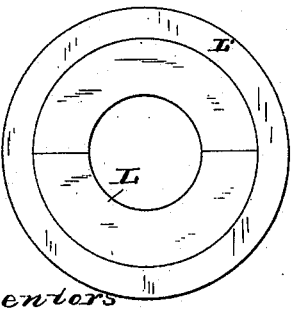
Witnesses.
Chas. R. Bull.
Fred J. Church.
Inventors
Herman Hollerith and
Samuel G. Metcalf
by Church & Church
their Attorneys

UNITED STATES PATENT OFFICE.

HERMAN HOLLERITH AND SAMUEL G. METCALF, OF NEW YORK, N. Y.

APPARATUS FOR CORRUGATING METAL TUBING.

SPECIFICATION forming part of Letters Patent No. 349,718, dated September 28, 1886.

Application filed February 4, 1886. Serial No. 190,841. (No model.)

*To all whom it may concern:*

Be it known that we, HERMAN HOLLERITH and SAMUEL G. METCALF, of New York city, county, and State, have invented a certain new and Improved Apparatus for Corrugating Metal Tubing; and we do hereby declare the following to be a full, clear, and exact description of the same, reference being had to the accompanying drawings, and to the figures and letters of reference marked thereon.

Numerous attempts have been made heretofore to provide a machine for corrugating metal tubing to be used for expansion-joints in steam-pipes, boiler flues and tubes, condensers, and other analogous purposes; but, so far as we are aware, none of these attempts have resulted in the production of a machine capable of forming corrugations in which the metal is of the same thickness, or approximately so, throughout the length of the section; but in all of the corrugated sections the metal is stretched at some points much more than at others, so that after a comparatively small number of expansions and contractions one of these weaker corrugations will give way, rendering the whole section worthless. Take, for example, a machine in which the tube to be operated upon is placed within a mold suitably corrugated, and, by means of hydraulic pressure applied to the inside, is pressed outward, so as to take the form of the inside of the mold. In this case the tube will, as soon as pressure is applied, expand, and will bite upon the highest points of the mold, and as the pressure is increased the metal between these points will be pressed outward and take the shape of the corrugation, and will be greatly stretched at the outermost point in two directions to allow for the increase in the direction of the length, (no slipping of the metal taking place, as is generally relied upon,) and also to allow at the outer portion of the corrugation for the increase in the circumference from the original size. In order to illustrate this more clearly we have shown in Figure A of the drawings a portion of a mold, 1, such as described, showing in dotted lines the position the tube 2 occupied originally and the thickness thereof, and in full lines the position and form after the corrugations are formed and the stretching to which it is subjected. The metal of the tube formerly occupying the space between the projections 3 and 3 of the mold is thus stretched to conform to the contour of the mold from 3 to 4 to 3, and its thickness thereby materially decreased at the outer portions, while the portions in contact with the parts 3 of the mold are not stretched to any appreciable extent, but remain the same thickness. When the corrugations thus formed are subjected to a number of expansions and contractions, nearly all the motion will take place at the outer extremity of the corrugation—the weakest point—which will soon give way, rendering the section worthless.

The object of our invention is to provide an improved apparatus for forming corrugations in tubing, which latter shall be of equal strength and thickness throughout and of any desired depth; and it consists, generally, in mechanism for compressing longitudinally a tube that has been previously filled with some incompressible fluid—such as water—and of a mold consisting of partible rings or sections adapted to be placed upon said tube, so that as the latter is compressed it will bulge out between the sections and a corrugation be formed, the mold-sections moving toward each other during the pressing operation; and it further consists in certain novel details of construction and combinations of parts, all as we will now proceed to describe.

In the accompanying drawings, Figure 1 is a longitudinal sectional view of a machine constructed in accordance with our invention. Fig. 2 is a similar view of the machine in another position. Fig. 3 is a top plan view of the same; Fig. 4, a view of one of the sections of the mold removed. Figs. 5, 5ª, 6, 7, 8, and 9 are views of modified forms of apparatus.

Similar letters of reference in the several figures denote the same parts.

A represents the frame or bed of the machine, constructed preferably of iron, having at one side a stationary head, B, and at the opposite side a movable head, C, connected to a plunger, C', passing through packing-rings $c$ and into a cylinder, $C^2$, where it is adapted to be actuated forward toward the stationary head by hydraulic pressure, the fluid being forced in through a pipe from any suitable pumping apparatus.

D D represent partible rings, which form the sections of the mold, constructed, as shown in Fig. 4, in two parts, D' D², fastened together by two metal loops or links, $d$, adapted to be placed over the lugs $d'$ $d'$, formed at the ends of the sections. Each section D' D² is constructed with the lugs $d'$ $d$ at the ends, as described, which come opposite each other when the sections are brought together, and with grooves $d^2$ $d^2$ on their upper and lower sides, diagramatically opposite each other, with the internal rib or projection, $d^3$, shaped according to the desired corrugation, (in this instance slightly rounded and tapering toward both sides,) as shown in section in Fig. 1, being substantially the shape of the corrugation to be formed in the tubing. When brought together around the tube and fastened by the links $d$, the mold-section is complete, the line of division between the two parts being diagonal, and the grooves $d^2$ being at top and bottom. These sections may, if desired, be united at one side by a hinge-joint and fastened at the other by a pin passed through interlocking lugs, as will be readily understood.

The term "partible," applied to the mold-sections, is used to cover the section adapted to be removed from the tube in any manner, whether made of frangible material and adapted to be broken or made in sections fastened together as described.

The end sections, E E, of the mold, one of which is secured to the stationary and the other to the movable head by bolts $e$, are each composed of one-half of a movable section, having one plain side, as shown in Fig. 1, and they serve to clamp a flange on the end of the tube to the head, and to form one-half of the end corrugation on the tube.

F F represent two horizontal rods secured to the frame above and below the line of movement of the plunger-head, forming guides for the mold-sections, into the slots $d^2$ in which they project.

The tube to be corrugated has its ends formed with flanges $g'$, which are placed against the stationary and movable heads, respectively, and are secured to them by means of the rings E E, placed over the flanges (suitable packing, $h$, being placed between the end of the tube and the heads, if desired) and bolted to the heads by the bolts $e$. The movable mold-sections D are now placed around the tube with the guide-rods in the slots $d^2$, as described. The links $d$ are then put on, connecting the sections firmly together. Through an aperture and a pipe, I, in the stationary head the interior of the tubing is filled with water or some other incompressible fluid, a suitable pump being provided, connecting with the pipe I, so that any desired pressure can be given this fluid. The sections D, it will be noticed, are placed upon the tube in such manner and in such position that the amount of metal between their points of contact will be just sufficient for one corrugation. Pressure being applied to the piston, the movable head will be moved toward the stationary head and the tube compressed longitudinally, causing it to bulge out between the sections (the water within preventing its collapse) until the latter are tightly clamped to it, and upon further movement of the piston the metal of the tube will be forced out farther between the mold-sections and the latter drawn toward each other until they touch, as shown in Fig. 2, when the tube will be formed into corrugations just filling the mold, each corrugation containing the same amount of metal of the same density throughout.

In order to allow for the escape of a small amount of water from the inside of the tube, (as will be necessary during its compression,) we provide a loaded valve, $i$, adapted to open when the pressure becomes too great, a weight, $i'$, on the lever of the valve being made adjustable, so that the pressure can be varied when desired.

It may be desirable for certain purposes to form all the corrugations at the same time, and this may be accomplished by means of wedges I', sliding loosely on rods or bars I², and placed between the mold-sections, and adapted to be withdrawn by any suitable mechanism either connected with the movable head or with the pump supplying hydraulic pressure to it, so that at each stroke of the pump-piston the wedges will be withdrawn a short distance, the connection being formed in any suitable manner. When the connection is made with the head, the bars I² are connected with links 7 7 and 8 8, which are connected to one end of bell-crank levers 9 9 and 10 10, while the other ends are pivoted to links 11 11 and 12 12, connected to the movable head, as shown in Fig. 5ª. Now, it will be seen that as the head C is moved the bars I² will be gradually separated and the links withdrawn from between the mold-sections, permitting them to come together. The bell-crank levers may be pivoted on any suitable support, and their length may be so regulated that the wedges may be withdrawn relatively slower or faster, as desired; or any other suitable manner of connecting the wedges and head may be provided.

Sometimes it may be desirable to form the corrugations one at a time, in which event we use the apparatus shown in Fig. 6. In this instance, instead of placing a number of mold-sections corresponding to the number of corrugations to be formed upon the tube in the first place, we provide two sections to start with, one secured to the stationary head, as before, and a movable split mold-section, H', having one plain side, instead of two recessed sides, for forming the sides of two corrugations, as before described. As shown in said figure, the tube is secured to the movable and stationary heads and filled with water, as before. Then the movable mold-section H' is put on the tube, a space being left between it and the end section equal to the amount of metal employed to form one corrugation, the remainder of the length of the tube being filled with plain split collars, K, applied to the outside, the last one being secured to the piston-head by bolts, as shown. When the piston is moved forward, the tube will be pressed up into the space between the mold-sections and the corrugation formed. Then the pressure is removed from the piston and the two plain collars next the mold-section removed, and the latter moved to the left into their position; then a complete mold-section, such as shown in Fig. 4, is placed next the corrugation already formed, as shown in Fig. 7, and the movable head moved up, forming the next corrugation, and so on. The successive corrugations are formed in this manner one at a time, removing the plain collars and placing the mold-sections between each corrugation, as will be readily understood.

When small tubes are to be corrugated, where it would be impracticable to fasten the small mold-sections together by links, as shown in Fig. 4, we provide small mold-sections L, without the lugs $d'$ and grooves $d^2$, adapted to be placed upon the tube and held together by solid collars L', slipped over them, as shown in Fig. 8. In this instance the same operation of forming one corrugation at a time is practiced as was practiced with reference to Fig. 7, the small collars being split also and held together by solid rings or collars and the mold-sections put on in place of the smooth collars after a corrugation is made, as before.

In Fig. 9 is shown one of the split mold-sections L and the solid collar for holding the sections together.

From the above description it will be seen that a simple and serviceable machine is provided that will corrugate metal tubing from the largest to the smallest sizes, and that the corrugations formed will be of the same size and strength through the length of the section.

While we have described but a few forms of apparatus for carrying out our invention, it is obvious that a great variety can be devised, all tending to the same end, and we therefore do not wish to be confined to the precise form of apparatus shown. For instance, it is obvious that the ring-sections forming the mold might be placed upon the tube the proper distance apart, and water forced in by gradually increasing pressure through the stationary head, forcing the tube out between the sections and drawing the rings together, the movable head in this instance merely following the tube, slight pressure being applied to the plunger; and, if desired, the wedges between the rings may or may not be employed.

We claim as our invention—

1. In an apparatus for corrugating metal tubes, a tube closed at its ends and adapted to be filled with a fluid, an internally-corrugated mold surrounding the tube, and means for imparting longitudinal pressure to the tube, substantially as described.

2. In an apparatus for corrugating metal tubes, a tube closed at its ends and adapted to be filled with a fluid, a mold for surrounding said tube, constructed of independent partible rings or sections, and means for imparting longitudinal pressure to the tube, substantially as described.

3. In an apparatus for corrugating metal tubes, a tube closed at its ends and adapted to be filled with a fluid, a mold consisting of independent partible sections or rings shaped to form a corrugated interior for the molds and adapted to be applied to the outside of the tube, and means for compressing the tube longitudinally, substantially as described.

4. The mold herein described for forming corrugations in metal tubing, consisting of independent partible sections or rings shaped to form a corrugated interior for the mold and adapted to be applied to the outside of the tube, substantially as described.

5. In a machine for corrugating metal tubing, the combination, with the stationary head, of the movable head adapted to be moved toward said stationary head by hydraulic or other pressure, and means for securing the ends of the tube to the stationary and movable heads, respectively, substantially as described.

6. In a machine for corrugating metal tubing, the combination of the stationary and movable heads, means for securing the ends of the tube to said heads, and the partible rings adapted to be placed upon the tube between said heads, substantially as described.

7. In a machine for corrugating metal tubing, the combination of the movable and stationary heads, the tube secured to them, the partible rings or sections adapted, when pressed together, to form a corrugated mold mounted upon the tube, and the rings forming a part of said mold and mounted on said movable and stationary heads and securing the tube to them, substantially as described.

8. In a machine for corrugating metal tubing, the combination of the movable and stationary heads, the tube secured between them, and a passage through the stationary head communicating with the interior of said tube, and a loaded valve for regulating the pressure of the fluid within the tube, substantially as described.

9. The mold herein described for forming corrugations in metal tubing, consisting of rings or sections shaped to form a corrugated interior for the mold, made in two parts secured removably together, substantially as described.

10. The mold herein described for forming corrugations in metal tubing, consisting of rings or sections shaped to form a corrugated interior for the mold, made in two parts having corresponding lugs, and the link for connecting them to fasten the parts of the ring together, substantially as described.

11. The mold herein described for forming corrugations in metal tubing, consisting of rings or sections shaped to form a corrugated interior for the mold, made in two parts secured removably together and having the grooves therein, in combination with guide-rods inserted in said grooves, substantially as described.

12. The combination, with the tube and the partible mold sections mounted thereon, of the movable wedges placed between the sections, and means for withdrawing the wedges as the pressure within the tube is increased, substantially as described.

13. In combination with the stationary and movable heads, the tube secured to them, the partible mold-sections mounted thereon, the movable wedges placed between the sections, and devices connecting the movable head with the wedges, whereby as the heads approach each other the wedges will be gradually withdrawn from between the mold-sections, substantially as described.

HERMAN HOLLERITH.
SAMUEL G. METCALF.

Witnesses as to Herman Hollerith:
DAVID FERGUSON,
A. W. FERGUSON.

Witnesses as to Samuel G. Metcalf:
CHAS. A. MURPHEY,
M. L. BAUSH.